April 28, 1964 W. J. VERMEER 3,130,859
APPARATUS FOR DISPENSING GOODS
Filed May 8, 1961 2 Sheets-Sheet 1

Willem J. Vermeer
INVENTOR

BY Wenderoth, Lind & Ponack
ATTORNEYS

April 28, 1964  W. J. VERMEER  3,130,859
APPARATUS FOR DISPENSING GOODS

Filed May 8, 1961  2 Sheets-Sheet 2

Willem J. Vermeer
INVENTOR

BY Wenderoth, Lind + Ponack
ATTORNEYS

United States Patent Office 3,130,859
Patented Apr. 28, 1964

3,130,859
APPARATUS FOR DISPENSING GOODS
Willem Jacobus Vermeer, Nijmegen, Netherlands, assignor to N.V. Hoornsche Metaalwarenfabriek v/h G. Scholten, Hoorn, Netherlands, a limited liability corporation of the Netherlands
Filed May 8, 1961, Ser. No. 124,745
Claims priority, application Netherlands May 12, 1960
4 Claims. (Cl. 221—78)

The invention relates to an apparatus for the dispensing of goods, provided with a conveyor, e.g. an endless belt or chain, with supports for the goods, which supports by means of the conveyor can be moved past a delivery chute.

It is known to attach the goods to the supports in such a machine which is used e.g. for the delivery of packed liquids, such as milk with the aid of clamps. Near the delivery chute there are cams with which the clamps come into contact during movement of the supports past the delivery chute in such a manner that the clamps are opened and the goods can be removed from the delivery chute. Since when filling the machine the goods must be clamped one by one the filling of the machine requires much time. With the known machine, moreover, the risk of disturbances in the operation is great owing to the incorrect placing of the goods into the clamps because of which these become clamped due in the inclined position and because the cooperation of clamps and cams not always is faultless so that the possibility exists that the clamps do not release the goods at the delivery chute. This drawback especially presents itself when a number of goods are placed beside each other on a support for goods and the delivery takes place in stepwise fashion through a stepped opening to the chute, for which purpose a cam construction is present for each step of the opening. A further drawback of the known machine is that differently executed clamps are required for different shapes of goods and packages respectively.

The invention has as an object the improvement of the known dispensing machine in such a manner that the said drawbacks do not occur.

For that purpose, according to the invention, dispensing members are provided, which during movement of the supports for the goods past the delivery chute press the goods from the supports into the chute.

With the improvement according to the invention the advantage is achieved that the machine is considerably simplified, consequently less vulnerable. The goods can be put directly on the supports without the intermediary of attaching means, owing to which the filling of the machine can take place very rapidly. Because attaching means, such as clamps are lacking there are few restrictions on the shape of the goods and packages respectively with the machine according to the invention.

A suitable embodiment of the invention is one in which the dispensing members are formed by resilient means arranged opposite or above the delivery chute of the machine which during movement of the supports for the goods past the delivery chute are tensioned and thereupon detensioned in such a way that they press the goods from the support into the chute.

According to the invention the dispensing members consist preferably of one or more blade springs which in untensioned condition extend into the passage for the supports for the goods and initially are pressed out of the passage by a support for the goods when it moves past the delivery chute and which, after the support has passed the blade spring, try to take the original position in the passage and thereby press the goods from the support into the chute.

The movement of the supports for the goods is caused, according to the invention, preferably by the weight of the goods. Owing to the lack of any external driving source, such as an engine with transmissions, the risk of disturbances is considerably reduced.

An embodiment of the invention is further elucidated by way of the drawing.

Figure 2:
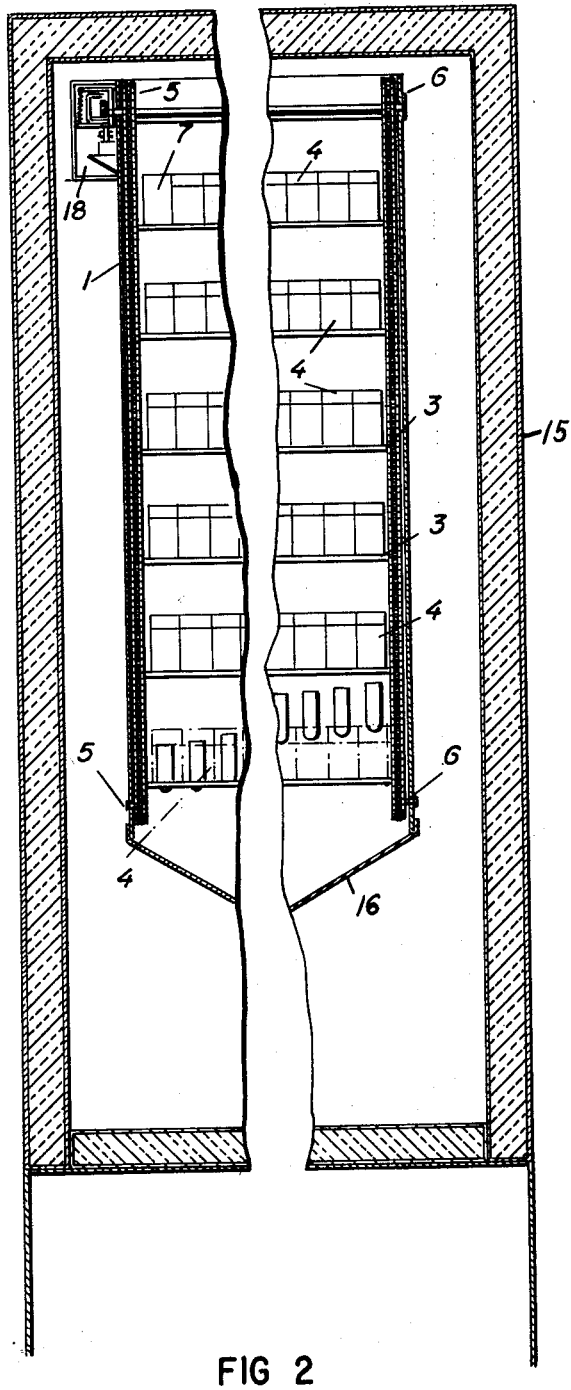
FIGURE 2 is a front view of the conveyor according to FIGURE 1, the delivery chute of the machine also being diagrammatically indicated.
Figure 1:
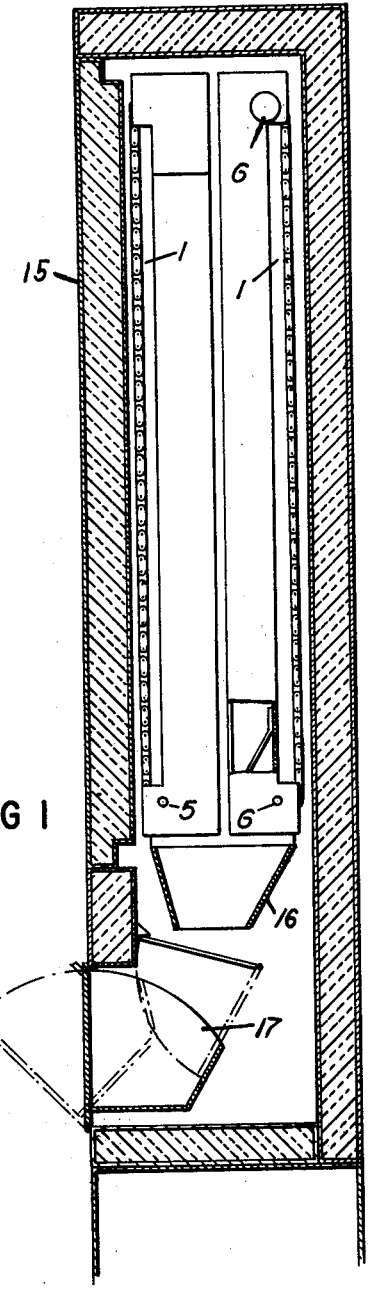
FIGURE 1 is a diagrammatic side view of the conveyor of the machine according to the invention.

According to FIGURES 1 and 2 the conveyor according to the invention is formed by two conveyor belts or chains 1 and 2 between which supports 3 for the goods 4 are arranged. The supports 3 may have the shape of plates, rods and the like. The belt or chain 1 is guided over rollers 5, the belt or chain 2 over rollers 6 which are mounted in a suitable manner in the housing 15 of the machine. Only the descending portion of the conveyor is filled with goods, so that when a locking means 18 for the conveyor is released by the insertion of a coin into the machine the supports 3 for the goods are moved by the weight of the goods themselves. The locking means for the conveyor which is known per se and does not form a part of the invention, has not been described in detail. To insure that when the machine has been substantially emptied, the driving force for the conveyor is still sufficiently great, a weight 7 may e.g. be put on the uppermost support for the goods. This weight then takes the place of the goods to be delivered last.

Figure 3:
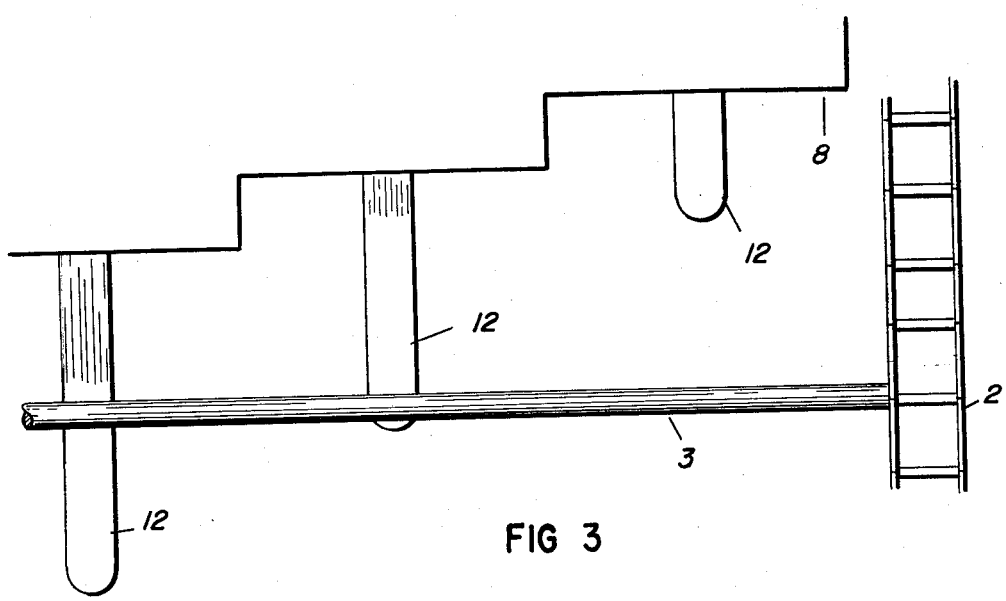
FIGURE 3 is a front elevation view, on an enlarged scale, showing a support for the goods moving past a dispensing member according to the invention.
Figure 4:
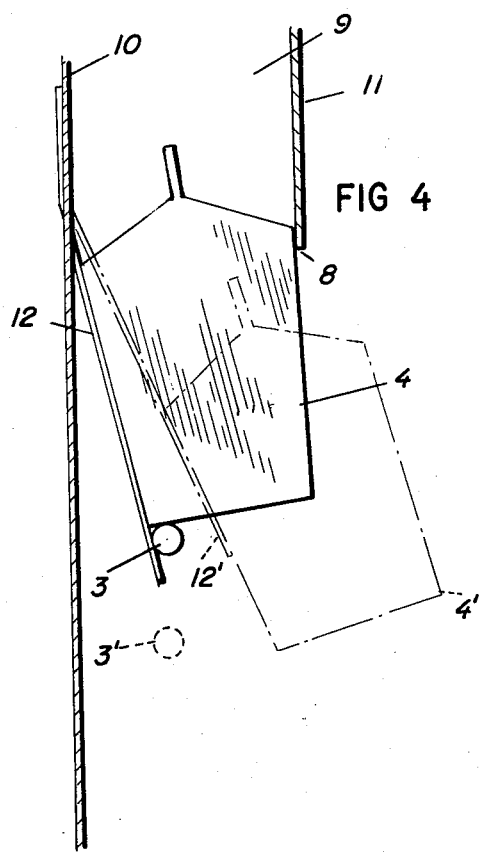
FIGURE 4 is a sectional view of the part of the apparatus of FIG. 3 with a package on the support and showing in dot-dash lines the support for the goods after it has passed a dispensing member.

In an embodiment according to the invention a number of goods 4 are placed beside each other on each support 3 and the dispensing of the goods takes place from each support stepwisely through a stepped opening, diagrammatically represented in FIGURES 3 and 4 to the delivery chute means 16, 17. In case there is only one object on each support, it will be possible for the opening 8, however, to be a single opening.

In FIGURE 4 is shown the passage 9 for the supports 3 for the goods at the location of the opening 8. The passage 9 is defined by the rear wall 10 of the machine and the front wall 11 in which is the opening 8. The wall 11 has separately removable parts with a height of the magnitude of the distances between the supports to facilitate filling of the machine. Opposite each step of the opening 8 there is a dispensing member 12 according to the invention. In the embodiment represented this member 12 consists of a blade spring the one end of which is attached to the rear wall 10 of the machine and the other end of which normally extends freely into the passage 9.

When the supports 3 for the goods move through the passage 9 the free resilient end of the blade spring 12 initially will be pressed out of the passage 9 to the rear by the supports. The position of the support in which blade spring 12 is tensioned to a maximum is represented in full lines in FIG. 4. As soon as the support 3 has moved past the free end of the blade spring 12 (dot-dash line position 3' in FIG. 4) the blade spring will try to take the original untensioned position 12', the blade spring thereby pressing the goods from the supports through the opening 8 into the delivery chute.

In FIGURE 3 the condition is represented in which a support 3 for the goods has already moved past a first blade spring (at the right), a second (central) blade spring is tensioned to a maximum and a third blade spring (at the left) is partially tensioned.

It is pointed out that the invention is not limited to the use of blade springs, but that also other means may be applied to press the goods through the opening 8 from the supports into the delivery chute.

I claim:

1. An apparatus for dispensing articles, comprising a conveyor having a part thereof extending in a vertical path, the conveyor being adapted to run downwardly along said vertical path, a plurality of support members at spaced intervals along said conveyor for supporting the articles to be dispensed against gravity, a front wall adjacent the vertical path at least near the bottom of said vertical path and having a lower edge at the point at which the articles are to be dispensed from the conveyor, and resilient means mounted on said front wall and normally projecting into the path of the support members on said conveyor in an untensioned condition at a point immediately below the lower edge of said front wall from a point on the other side of the vertical path from said vertical wall and adapted to be moved out of the path of the support members when the conveyor moves downwardly by the movement of said support members against said resilient means, whereby when the support members have passed said resilient means, said resilient means springs back into the path of the conveyor toward the front wall and urges an article to be dispensed off said support members and under the lower edge of said front wall.

2. An apparatus as claimed in claim 1 in which said resilient means is a leaf spring.

3. An apparatus as claimed in claim 1 in which said support members each have space for a plurality of articles to be dispensed placed side by side on said support members, and said lower edge of said front wall has a plurality of portions, one for each position occupied by an article on a support member, each portion of said lower edge being at a different height, and said resilient means comprises a plurality of leaf springs, one projecting into the path of the support members on the conveyor just below each portion of the lower edge of said front wall, whereby only one article will be dispensed from a support member at a time and the different articles on each support member will be dispensed at different vertical positions on said vertical path.

4. An apparatus as claimed in claim 1 further comprising a back wall along said vertical path of said conveyor spaced from said front wall a distance substantially the dimension of an article to be dispensed in the direction transverse to the vertical path, said resilient means being mounted on said back wall and said back wall helping to hold the articles to be dispensed in position on said support members.

References Cited in the file of this patent

UNITED STATES PATENTS

| | | |
|---|---|---|
| 1,849,145 | Illig et al. | Mar. 15, 1932 |
| 2,474,168 | Sacher et al. | June 21, 1949 |
| 2,888,165 | Bookout et al. | May 26, 1959 |